(12) United States Patent
DesMarteau et al.

(10) Patent No.: US 6,546,740 B1
(45) Date of Patent: Apr. 15, 2003

(54) TERNARY REFRIGERANT COMPOSITIONS WHICH CONTAIN PERFLUOROORGANO SULFUR COMPOUNDS AS REPLACEMENTS FOR R-22

(75) Inventors: Darryl D. DesMarteau, Clemson, SC (US); Adolph L. Beyerlein, Clemson, SC (US); Ismail Kul, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 09/575,086

(22) Filed: May 19, 2000

(51) Int. Cl.$^7$ .............................................. F25D 25/00
(52) U.S. Cl. ............................ 62/114; 62/114; 252/67; 252/68
(58) Field of Search ........................ 252/67, 68; 62/114

(56) References Cited

U.S. PATENT DOCUMENTS

| | | | |
|---|---|---|---|
| 5,108,637 A | 4/1992 | Pearson | 252/67 |
| 5,340,490 A | 8/1994 | Descaire et al. | 252/67 |
| 5,387,357 A | 2/1995 | Shifatt et al. | 252/67 |
| 5,403,504 A | 4/1995 | Bivens et al. | 252/67 |
| 5,433,880 A * | 7/1995 | Minor et al. | 252/67 |
| 5,480,572 A * | 1/1996 | Minor | 252/67 |
| 5,605,882 A | 2/1997 | Klug et al. | 510/411 |
| 5,607,616 A | 3/1997 | Minor et al. | 252/67 |
| 5,648,016 A | 7/1997 | Klug et al. | 252/67 |
| 5,650,089 A | 7/1997 | Gage et al. | 252/67 |
| 5,670,079 A | 9/1997 | Lunger et al. | 252/67 |
| 5,702,632 A | 12/1997 | Weng | 252/67 |
| 5,709,092 A | 1/1998 | Shiftlett | 62/114 |
| 5,713,211 A | 2/1998 | Sherwood | 62/114 |
| 5,819,549 A | 10/1998 | Sherwood | 62/246 |
| 5,961,321 A | 10/1999 | Vetterick et al. | 431/350 |

FOREIGN PATENT DOCUMENTS

| | | |
|---|---|---|
| WO | 9324586 | 12/1993 |
| WO | 9808912 | 3/1998 |

OTHER PUBLICATIONS

A.L. Beyerlein, D. DesMarteau, "Report to Electric Power Reseach, Institute: Novel New Chemicals and Mixtures as R–22 Alternatives", Mar. 8, 1999, pp. 1–27.

A.L. Beyerlein. D. DesMarteau. "Report to Electric Power Reseach, Institute: Novel New Chemicals and Mixtures as R–22 Alternatives", Mar. 8, 1999, pp. 1–27.

\* cited by examiner

*Primary Examiner*—Yogendra N. Gupta
*Assistant Examiner*—Eisa Elhilo
(74) *Attorney, Agent, or Firm*—Peters, Verny, Jones & Schmitt, LLP; Howard M. Peters

(57) ABSTRACT

Refrigerant compositions include mixtures of at least three different components, including a fluorinated sulfur-containing compound with at least one of a fluorinated ether or a fluorinated hydrocarbon. Also, methods for cooling a body include compressing such a refrigerant composition and bringing the body into heat transfer relation to it. The disclosed refrigerant compounds have refrigerant-significant properties similar to those of R-22, and they can be employed as drop-in substitutes in refrigeration apparatus designed for R-22 application.

18 Claims, No Drawings

TERNARY REFRIGERANT COMPOSITIONS WHICH CONTAIN PERFLUOROORGANO SULFUR COMPOUNDS AS REPLACEMENTS FOR R-22

BACKGROUND

1. Field of the Invention

This invention relates to refrigerants and, particularly, to mixtures suitable for use as substitutes for hydrochlorofluorocarbons (HCFCs) and chlorofluorocarbons (CFCs) in refrigeration. The novel replacements for R-22 are ternary mixtures including components selected from hydrofluorocarbons, hydrofluoroethers and perfluoroorgano sulfur compounds.

2. Description of Related Art

In recent years it has been suggested that release of certain hydrochlorofluorocarbons and chlorofluorocarbons may have adverse long-term effects on the earth's atmosphere. Particularly, these compounds are thought to undergo a ultraviolet radiation induced decomposition in the upper atmosphere, releasing chlorine atoms which are thought to react with ozone. The reaction of chlorine with ozone could reduce the extent of the protective stratospheric ozone layer. Depletion of the ozone layer could permit increased penetration of harmful ultraviolet radiation through the upper reaches of the atmosphere, with deleterious effects on the biosphere. Although this theory is not universally accepted, there has been a growing movement of international scope toward control of the production and use of certain CFCs and HCFCs.

Particularly, government regulation is forcing a phasing out of certain chlorine-containing refrigerants, and replacement of them with environmentally safer compounds.

Accordingly, considerable effort has been directed toward finding alternatives for CFCs and HCFCs. Suitable refrigerant substitutes would be expected to have both a lower potential to damage the atmosphere and an acceptably high performance in the particular refrigeration systems in which they are intended as replacements for the conventional or "first-generation" CFC or HCFC refrigerants. For example, Sherwood U.S. Pat. No. 5,713,211 describes certain fluoroethers said to be useful in secondary loop refrigeration.

To date, no single compound has yet proven completely satisfactory as a replacement for any of the conventional CFC and HCFC refrigerants. For example, HCFC 134a has proven to be a satisfactory substitute refrigerant for CFC-12 in most but not all applications. Much of the developmental effort in this field has been directed toward finding suitable mixtures, and particularly azeotropic or azeotrope-like mixtures. For example, Lunger et al. U.S. Pat. No. 5,670,079 describes non-flammable azeotropic and azeotrope-like mixtures of a hydrocarbon and a fluorine-containing molecule, in which the atmospheric boiling points of the components differ by at least 20° C. Bivens et al. U.S. Pat. No. 4,810,403 describes refrigerant mixtures of three or more selected halocarbons, each one after the first having a successively higher boiling point, and having a temperature/pressure relation like that of dichlorodifluoro ethane ($CCl_2F_2$, FC-12). Gage et al. U.S. Pat. No. 5,650,089 describes binary refrigerant mixtures, which may be azeotropic (or azeotrope-like) or zeotropic, in which the components are selected from certain hydrofluoroethers, hydrofluorocarbons, and hydrocarbons. Klug et al. U.S. Pat. No. 5,605,882 and U.S. Pat. No. 5,648,016 describe azeotropic and azeotrope-like mixtures of a fluoroether and a hydrofluorocarbon, said to be useful among other applications as refrigerants. Minor et al. U.S. Pat. No. 5,443,880 described binary refrigerant mixtures in which one of the components is a sulfur-containing compound. Pearson U.S. Pat. No. 5,108,637 describes refrigerants including ternary mixtures in "nonflammable proportions", which may or may not be azeotropic. Shiflett U.S. Pat. No. 5,709,092 describes nonflammable near-azeotropic or essentially constant boiling mixtures of at least two components, and particularly ternary mixtures of certain fluorocarbons, said to be especially useful as supermarket case refrigerants. All the patents and other publications cited in this application are hereby incorporated herein in their entirety.

Chlorodifluoromethane ($CHClF_2$, R-22) is one refrigerant for which a suitable substitute has been especially difficult to find. Refrigerant-significant parameters of a refrigerant mixture suitable for use as a R-22 substitute include: low boiling point ($T_b$ for R-22 is about −41° C.); high critical temperature ($T_c$ for R-22 is about 96° C.); critical mixing temperature well below the boiling point; and an acceptable flammability limit. Preferably the refrigerant is substantially non-corrosive to parts and fittings of the refrigeration apparatus which it contacts in use.

SUMMARY OF THE INVENTION

We have discovered that certain combinations of three or more different compounds can provide refrigerant mixtures having properties that approximate those of R-22 and, accordingly, these mixtures are highly suitable as a drop-in substitute in R-22 refrigeration applications. The mixtures include at least one fluorinated sulfur-containing compound, and one or more of a fluorinated ether, and a fluorinated hydrocarbon. Preferred R-22 substitutes according to the invention are near-azeotropic, as these do not fractionate significantly over the range of temperature in use.

Accordingly, in one general aspect the invention features a refrigerant composition that is a mixture of at least three different components, in which at least a first one of the components is a fluorinated sulfur-containing compound and each of the second and the third components is a fluorinated ether or a fluorinated hydrocarbon. In some embodiments, each of at least three components is present in a proportion at least 10 mole percent, and more usually one or more (most usually all) of at least three components is present in a proportion of at least 20 mole percent. It is understood tht the total mol % of the ternary mixture described herein must equal 100%.

In some embodiments the fluorinated sulfur-containing compound is a fluorinated methyl sulfide. Particular fluorinated methyl sulfides include bis(trifluoromethyl) sulfide, $CF_3SCF_3$ (116S); and trifluoromethylsulfur pentafluoride, $CF_3SF_5$ (18S).

In some embodiments the fluorinated ether, where present, has the formula $C_{(n)}F_{(m)}H_{(2n+2-m)}O$, where n=2 or 3, and $3 \leq m \leq 8$. Particular fluorinated ethers include perfluoromethyl ethyl ether (trifluoromethyl pentafluoroethyl ether), $CF_3OCF_2CF_3$ (218E); pentafluorodimethyl ether, $CF_3OCF_2H$ (125E); and trifluoromethyl methyl ether, $CF_3OCH_3$ (143aE).

In some embodiments the fluorinated hydrocarbon, where present, has the formula $C_{(x)}F_{(y)}H_{(2x+2-y)}$, where x=1 or 2, and $1 \leq y \leq 2x$. Particular fluorinated hydrocarbons include 1,1,1,2-tetrafluoroethane, $CF_3CH_2F$ (HFC-134a); 1,1,1-trifluoroethane, $CF_3CH_3$ (HFC-143a); 1,1-difluoroethane, $CH_3CF_2H$ (HFC-152a); fluoroethane, $CH_3CH_2F$ (HFC-161); and difluoromethane, $CH_2F_2$ (HFC-32).

Embodiments of the invention that may provide particularly useful performance in R-22 refrigerant applications include mixtures of, for example: (trifluoromethyl sulfur pentafluoride/218E/152a) in molar proportions, e.g., (0.10/0.45/0.45) or (0.254/0.373/0.373) or (0.3/0.3/0.4) or (0.20/0.25/0.55); (trifluoromethyl sulfur pentafluoride/134a/218E) in molar proportions, e.g., (0.10/0.45/0.45).

In preferred embodiments the refrigerant composition is azeotropic or azeotrope-like. That is, it is a constant-boiling or substantially constant-boiling mixture of two or more substances that tends not to fractionate upon evaporation. Accordingly, the vapor produced by boiling or evaporation of the azeotropic or azeotrope-like mixture has the same or substantially the same composition as the liquid.

In another general aspect the invention features a method for cooling a body, by compressing a refrigeration composition according to the invention and bringing the body into heat transfer relation to it. The refrigeration compositions of the invention are effective drop-in substitutes for conventional CFC or HCFC refrigerants such as R-22, and can be employed in refrigeration apparatus designed for use with such conventional refrigerants, without retrofit or significant modification. Some retrofit or modifications include but are not limited to compressor lubricant oils may need to be changed. Accordingly, in another general aspect the invention features a refrigeration system, including refrigeration apparatus configured and dimensioned for use with refrigerant R-22, charged with a refrigerant composition of the invention.

DETAILED DESCRIPTION OF THE INVENTION AND PREFERRED EMBODIMENT

Definitions

As used herein:

"Fluorinated ether" refers to the fluorinated ethers used in this art. Some are identified by a convention:

| Term | Fluorine-Containing |
| --- | --- |
| 18S | Trifluoromethyl pentafluoride |
| R22 | Chlorodifluoromethane |
| 32 | Difluoromethane |
| 116S | Bis(trifluoromethlysulfide) |
| 125 | Pentafluoroethane |
| 125E | Pentafluorodimethyl ether |
| 134a | 1,1,1,2-Tetrafluoroethane |
| 143a | 1,1,1,-Trifluoroethane |
| 152a | 1,1-Difluoroethane |
| 161 | Fluoroethane |
| 218E | Perfluoromethyl ethyl ether |

Two-component mixtures having as one component a perfluorinated organosulfur compound and as another component an HFC or ether with a low fluorine content may have boiling points and critical temperatures approaching those of R-22, but these are usually not miscible over the range of temperatures and pressures they encounter in use. We have discovered that admixture of a third component, particularly a fluoroether or HFC, having a fluorine content between that of the first two components, can provide for improved miscibility and better refrigerant-significant characteristics.

Particularly, for use as R-22 substitutes, preferred mixtures have a boiling point lower than −30° C., usually below about −32° C., still more usually below about −33° C. The boiling points are calculated from measured vapor pressure data using the following relation between Kelvin temperature (T) and the vapor pressure (P):

$$\ln P = A + B \ln T + C/T,$$

in which A, B and C are empirically derived constants.

Particularly for use as R-22 substitutes, preferred mixtures have a critical temperature higher than about 70° C., still more usually higher than about 80° C., and most usually in the range about 85–100° C. The critical temperatures ($T_c$) of the mixtures are measured by slowly raising the temperature of the sample in a sealed tube until disappearance of the meniscus is observed. Alternatively or additionally, the critical temperature ($T_c$) can be estimated from the measured critical temperatures $T_{ic}$ of the pure components and the component mole fractions $X_{ic}$ using the relation (for three components, i=1, 2, 3):

$$T_c = X_1 T_{1c} + X_2 T_{2c} + X_3 T_{3c}.$$

Preferred mixtures have a critical mixing temperature below the boiling point, usually at least about 5° C. below the boiling point.

The mixtures preferably are substantially non-flammable. Exceptions may include mixtures that contain both E-125 and R-161, and mixtures that contain both E-125 and R-152a. Generally, mixtures in which the fraction of C—F and S—F bonds exceeds the fraction of C—C and C—H bonds are substantially non-flammable or have flammability limits that are acceptable for commercial units in the refrigeration industry.

Preferred mixtures are near-azeotropes; that is, they are characterized by showing less than about 2% separation at temperatures within the operational range.

The invention is now described in further detail.

Each of the components employed in the mixtures according to the invention is known, and either is commercially available in the desired purity or can be synthesized to the desired purity using published methods of synthesis. The patent literature in the refrigerant arts describes methods for synthesizing the various components, or refers to methods published elsewhere.

Particularly, where certain of the components may not be readily available commercially, the following methods are suggested.

218E (CAS Reg. No. 665-16-7) by direct fluorination of CF3OCH2F3 (prepared by reaction of CF3OF with vinyledine fluoride), see Sekiya et al., 1990, *Chemistry Letters*, pp. 767–70.

143aE (CAS Reg. No. 421-14-7) by reaction of methyl fluoroformate with sulfur tetrafluoride, see Aldrich et al., 1964, *Jour. Am. Chem. Soc.*, Vol. 29, pp 11–15.

125E (CAS Reg. No. 3822-68-2) by electrochemical fluorination of dimethyl ether (CH3OCH3), see Fox et al. U.S. Pat. No. 511,760; Hutchinson U.S. Pat. No. 3,887,439.

116S (CAS Reg. No. 371-78-8) by thermal decomposition of CF3C(O)OSCF3, see Haas et al., 1969, *Chem. Ber.*, Vol. 102, pp. 77–82.

SF5CF3, trifluoromethylsulfur pentafluoride (CAS Reg. No. 373-80-8) by reaction of methyl mercaptan with either cobalt trifluoride or fluorine gas, see Silvey et al. U.S. Pat. No. 2,697,726; Silvey et al., 1950, *Jour. Am. Chem. Soc.*, Vol. 79, pp. 3624–26.

Compounds 32 [difluoromethane], 161 [fluoroethane], 152a [1,1-difluoroethane], 143a [1,1,1-trifluoroethane], 134a [1,1,1,2-tetrafluoroethane], 125 [pentafluoroethane] are commercially available and may where necessary be purified by distillation or other conventional method.

The components may be combined by any of a variety of conventional methods to yield a mixture having the desired proportions.

A refrigeration system may be charged with a refrigerant mixture according to the invention by conventional means. Because the mixtures are effective as drop-in substitutes or replacements for R-22, they may be used to charge any refrigeration apparatus designed for use with R-22 refrigerant without retrofitting or mechanical adaptation.

The following Examples are proceeded to be descriptive and ex employ only.

They are not to be construed as limiting in any way.

EXAMPLE 1

Ternary mixtures including a fluorinated sulfur-containing compound and a

Fluorinated Ether

This example, referring to Table 1, shows exemplary ternary mixtures containing as one component a fluorinated sulfur-containing compound (particularly, trifluoromethyl sulfur pentafluoride), and as a second component a fluorinated ether (particularly, perfluoromethyl ethyl ether (218E)).

TABLE 1

| Mole percentages | Components |
| --- | --- |
| .1/.45/.45 | trifluoromethyl sulfur pentafluoride/218E/152a |
| .254/.373 /.373 | trifluoromethyl sulfur pentafluoride/218E/152a |
| .3/.3/.4 | trifluoromethyl sulfur pentafluoride/218E/152a |
| .2/.25/.55 | trifluoromethyl sulfur pentafluoride /218E/152a |

EXAMPLE 2

Ternary mixtures including a fluorinated sulfur-containing compound and a

Fluorinated Hydrocarbon

This example, referring to Table 2, shows exemplary ternary mixtures containing as one component a fluorinated sulfur-containing compound (particularly, trifluoromethyl sulfur pentafluoride), and as a second component a fluorinated ether (particularly, perfluoromethyl ethyl ether (218E)).

TABLE 2

| Mole percentages | Components |
| --- | --- |
| .1/.45/.45 | trifluoromethyl sulfur pentafluoride/134a/218E |

Other embodiments are within the following claims.

While only a few embodiments of the invention have been shown and described herein, it will become apparent to those skilled in the art that various modifications and changes can be made in the improved replacement refrigerant compositions containing sulfur atoms without departing from the spirit and scope of the present invention. All such modifications and changes coming within the scope of the appended claims are intended to be carried out thereby.

What is claimed is:

1. A refrigerant composition consisting essentially of a mixture of three components, each said component being different from the other said components, a first said component being a first fluorinated ether and each of a second said component and a third said component being selected from the group consisting of a fluorinated ether, an ether, a fluorinated hydrocarbon, and a fluorinated sulfur-containing compound and said fluorinated sulfur-containing compound is a component, and wherein said three components when mixed have improved miscibility and show less than about 2% separation at temperatures within the operational range.

2. The refrigerant composition of claim 1 wherein said sulfur-containing compound is selected from the group consisting of bis(trifluoromethyl) sulfide and trifluoromethylsulfur pentafluoride.

3. The refrigerant composition of claim 1 wherein said second said component is a fluorinated ether.

4. The refrigerant composition of claim 1 wherein said second said component is selected from the group consisting of perfluoromethyl ethyl ether, pentafluorodimethyl ether, trifluoromethyl methyl ether.

5. The refrigerant composition of claim 1, consisting essentially of a mixture of trifluoromethyl sulfur pentafluoride and trifluoromethyl pentafluoroethyl ether and 1,1-difluoroethane.

6. The refrigerant composition of claim 5, said trifluoromethyl sulfur pentafluoride/trifluoromethyl pentafluoroethyl ether/1,1-difluoroethane being present in said mixture in molar proportions about 0.10/0.45/0.45.

7. The refrigerant composition of claim 5, said trifluoromethyl sulfur pentafluoride/trifluoromethyl pentafluoroethyl ether/1,1-difluoroethane being present in said mixture in molar proportions about 0.254/0.373/0.373.

8. A refrigerant composition consisting essentially of a mixture of trifluoromethyl pentafluoroethyl ether and trifluoromethyl sulfur pentafluoride and 1,1-difluoroethane.

9. The refrigerant composition of claim 5, said trifluoromethyl sulfur pentafluoride/trifluoromethyl pentafluoroethyl ether/1,1-difluoroethane being present in said mixture in molar proportions about 0.20/0.25/0.55.

10. The refrigerant composition of claim 1, consisting essentially of a mixture of trifluoromethyl sulfur pentafluoride and 1,1,1,2-tetrafluoroethane and trifluoromethyl pentafluoroethyl ether.

11. The refrigerant composition of claim 10, said trifluoromethyl sulfur pentafluoride/1,1,1,2-tetrafluoroethane/trifluoromethyl pentafluoroethyl ether being present in said mixture in molar proportions about 0.10/0.45/0.45.

12. A method for cooling a body, comprising steps of compressing the composition of claim 1 and bringing the body into heat transfer relation to said composition.

13. A refrigeration system, comprising refrigeration apparatus charged with the refrigerant composition of claim 1.

14. The refrigerant system of claim 13, said refrigeration apparatus being configured and dimensioned for use with refrigerant R-22.

15. A refrigerant composition consisting essentially of a first, second and third component wherein said first component is selected from the group consisting of perfluoromethyl ethyl ether, pentafluorodimethyl ether, and trifluoromethyl methyl ether, said second component is a fluorinated ether selected form the group consisting of perfluoromethyl ethyl ether, pentafluorodimethyl ether, and trifuloromethyl methyl ether and said third component is selected from the group consisting of bis trifluoromethyl sulfide and trifluoromethylsulfur pentafluorine.

16. The refrigerant composition of claim 15 wherein said first component is perfluromethyl ethyl ether.

17. The refrigerant composition of claim 15 wherein said second component is perfluoromethyl ether.

18. The refrigerant composition of claim 15 wherein said third component is trifluoromethyl sulfur pentafluoride.

* * * * *

UNITED STATES PATENT AND TRADEMARK OFFICE
CERTIFICATE OF CORRECTION

PATENT NO. : 6,546,740 B1
DATED : April 15, 2003
INVENTOR(S) : Darryl D. DesMarteau, Adolph L. Beyerlein and Ismail Kul It is certified that error appears in the above-identified patent and that said Letters Patent is hereby corrected as shown below:

Title page,
Item [56], References Cited, OTHER PUBLICATIONS, "A.L. Beyerlien, D. DesMarteau" reference, (both occurrences), delete "D." and insert -- D.D --.
Item [57], ABSTRACT,
Line 2, delete "drop - in".

Column 2,
Line 14, delete "-41 C" and insert -- -40.1 C --.
Line 41, delete "tht" and insert -- the --.

Column 3,
Line 20, delete "drop-in".
Lines 14-15, delete "without retrofit or significant modification".
Line 32, delete "penta fluoride" and insert -- sulfur pentafluoride --.

Column 4,
Line 50, delete "drop-in".
Line 59, delete "any".
Line 61, delete "without retrofitting or mechanical adaptation".

Column 6,
Line 49, delete "form" and insert -- from --.

Signed and Sealed this

Twenty-seventh Day of January, 2004

JON W. DUDAS
*Acting Director of the United States Patent and Trademark Office*